Patented Dec. 11, 1923.

1,477,276

UNITED STATES PATENT OFFICE.

FRANK PAUL McINTYRE, OF PHILADELPHIA, PENNSYLVANIA.

MANUFACTURE OF BUILDING BLOCKS AND SIMILAR MOLDED ARTICLES.

No Drawing.   Application filed July 15, 1920.   Serial No. 396,479.

*To all whom it may concern:*

Be it known that I, FRANK PAUL MC-INTYRE, a citizen of the United States, residing in Philadelphia, Pennsylvania, have invented certain Improvements in the Manufacture of Building Blocks and Similar Molded Articles, of which the following is a specification.

My invention relates to the construction of building blocks and similar molded articles, the purpose of my invention being to construct such articles in a very economical manner. To accomplish this I make use of what has hitherto been regarded as practically a waste product, namely, cinders, clinkers and ash of anthracite coal. I have perfected a method of constructing building blocks, hollow tile, bricks, and the like in which the referred to refuse is the principal ingredient. The blocks etc, are consequently very cheap and possess the additional advantages of being strong, durable, and, on account of their ash construction, highly resistant to fire.

Briefly stated, my invention consists in making building blocks or, in fact, any similar article which may be molded, of a compound consisting of, substantially, eight parts of ash, two parts of pulverized clinkers or cinders, and sufficient hydrate of lime to produce adhesion.

One method of mixing the ingredients, and that which I prefer, is as follows:

At the start, I remove all metals and combustible material from the ashes and then screen them through a fine mesh sieve. The clinkers and cinders are crushed and screened through the same or a similar sieve. I then place in a suitable mixing tub or vat, six parts of screened ash and two parts of screened clinkers and cinders. (Hereinafter, for convenience, I shall refer to the latter ingredient simply as "clinkers"). To this mixture I add a small quantity of lime. What is termed "fat flower of lime" is, I have ascertained, the most suitable form of the latter to use. The mixing vat is then tightly covered and the mixture paddled or otherwise agitated until a thorough admixture is effected. Water, in the necessary quantity is then added, and the tub covered until the lime is thoroughly slaked. Paddling or other agitation is again resorted to for a time and, finally, the remaining two parts of screened ash are added and the agitation resumed until the last addition of ash is thoroughly mixed in. The mixture is then in the form of an easily handled plastic mass which may be molded into any desired form. After being molded, the article is permitted to dry for a period of time and is then placed in a finishing room wherein it is subjected to the action of the heat of steam of very high temperature for a period of about ten or twelve hours. It is then complete and ready for use.

The reason I reserve two parts of ash for introduction into the mixture after the lime is slaked is this: These two parts are, before introduction, highly heated and then sprayed into the mixing vat. They serve to absorb any surplus moisture which may be present and insure a product of uniform consistency.

At times, and in the manufacture of certain articles where increased resistance to wear is desired the final two parts may consist of 75% ash and 25% sand rather than all ash.

Another method by which the admixture of ingredients may take place consists in slaking the lime in the mixing vat and, when completely slaked, adding the eight parts of ash and two parts of clinkers thereto, then paddling or otherwise agitating the mass until properly mixed.

It is, of course, obvious that a completed article could be glazed, enameled or otherwise finished or ornamented, if desired.

I may also add that I have ascertained that the most suitable cementing material to be used in connection with my blocks in building construction also consists of a mixture of ash and hydrate of lime but with the proportion of lime greater than it is in the block itself.

I claim:

1. The mode herein described of producing a plastic substance for molding articles, said mode consisting of mixing anthracite ash and lime, adding sufficient water to slake the lime and then adding additional ash.

2. The mode herein described of producing a plastic substance for moulding articles, said mode consisting in mixing anthracite ash, pulverized clinkers and lime, adding sufficient water to slake the lime and then adding additional ash.

In testimony whereof, I have signed my name to this specification.

FRANK PAUL McINTYRE.